United States Patent

Schaefer (10) Patent No.: US 8,957,806 B2
(45) Date of Patent: Feb. 17, 2015

(54) RADAR SYSTEM WITH SYNTHETIC APERTURE

(75) Inventor: Christoph Schaefer, Friedrichshafen (DE)

(73) Assignee: Astrium GmbH, Taufkirchen (DE)

( * ) Notice: Subject to any disclaimer, the term of this patent is extended or adjusted under 35 U.S.C. 154(b) by 280 days.

(21) Appl. No.: 13/542,176

(22) Filed: Jul. 5, 2012

(65) Prior Publication Data

US 2014/0009327 A1    Jan. 9, 2014

(30) Foreign Application Priority Data

Jul. 7, 2011  (DE) .......................... 10 2011 107 403

(51) Int. Cl.
| | |
|---|---|
| *G01S 13/90* | (2006.01) |
| *G01S 7/40* | (2006.01) |
| *G01S 7/03* | (2006.01) |
| *H01Q 3/26* | (2006.01) |
| *G01S 7/285* | (2006.01) |
| *G01S 13/02* | (2006.01) |

(52) U.S. Cl.
CPC ............... *G01S 13/9035* (2013.01); *G01S 7/40* (2013.01); *G01S 13/90* (2013.01); *G01S 7/03* (2013.01); *G01S 7/285* (2013.01); *H01Q 3/26* (2013.01); *G01S 2013/0245* (2013.01)
USPC .......................................... 342/25 F; 342/174

(58) Field of Classification Search
USPC ....................................................... 342/25 F
See application file for complete search history.

(56) References Cited

U.S. PATENT DOCUMENTS

| | | | | |
|---|---|---|---|---|
| 5,628,025 | A  * | 5/1997 | Chung et al. ....................... | 712/9 |
| 8,605,840 | B2 * | 12/2013 | Wasiewicz et al. ............ | 375/346 |
| 8,698,636 | B2 * | 4/2014 | Horng et al. ................. | 340/573.1 |
| 8,732,435 | B1 * | 5/2014 | Chou et al. ..................... | 711/217 |
| 2002/0122000 | A1 | 9/2002 | Bradley et al. | |
| 2012/0321024 | A1* | 12/2012 | Wasiewicz et al. ............ | 375/346 |

FOREIGN PATENT DOCUMENTS

EP    1 241 487    9/2002

OTHER PUBLICATIONS

Fischer et al., "Development of a High-Resolution Wide-Swath SAR Demonstrator," 8th European Conference on Synthetic Aperture Radar (EUSAR), 2010, pp. 1166-1169.

(Continued)

*Primary Examiner* — Matthew M Barker
(74) *Attorney, Agent, or Firm* — Greenblum & Bernstein, P.L.C.

(57) ABSTRACT

Synthetic aperture radar (SAR) system and method of processing signals in a SAR system. The SAR system includes includes a radar antenna having at least one partial antenna, of which each at least one partial antenna includes a plurality of phase centers with assigned transmit/receive modules and a signal processor for coherent processing of signals of the phase centers. The signal processors include a hybrid beam forming module structured and arranged to digitize and process analog receive signals received by the transmit/receive modules of the phase centers, and to convert the digitally processed receive signals into analog signals. Further, an analog receive network is structured and arranged to combine the analog signals of respective transmit/receive modules with one another to form an output signal.

20 Claims, 9 Drawing Sheets

(56) References Cited

OTHER PUBLICATIONS

Younis et al., "Antenna System for a Forward Looking SAR Using Digital Beamforming On-Rececive-Only," IGARSS 2000. IEEE 2000 International Geoscience and Remote Sensing Symposium, 2000, pp. 2343-2345.

European Search Report conducted in counterpart European Appln. No. 120 04 896.2-1248 (Dec. 3, 2012) (with partial English language translation).

* cited by examiner

Prior Art

Fig. 4

Prior Art

Fig. 9

RADAR SYSTEM WITH SYNTHETIC APERTURE

CROSS-REFERENCE TO RELATED APPLICATIONS

The present application claims priority under 35 U.S.C. §119 of German Patent Application No. 10 2011 107 403.5, filed on Jul. 7, 2011, the disclosure of which is expressly incorporated by reference herein in its entirety.

BACKGROUND OF THE INVENTION

1. Field of the Invention

Embodiments of the invention relate to a synthetic aperture radar (SAR) system with an antenna that includes one or several partial antennas. Each partial antenna includes a plurality of phase centers and transmit/receive modules assigned thereto and a signal processor for the coherent processing of signals of the phase centers or radiators.

2. Discussion of Background Information

Figure 1:
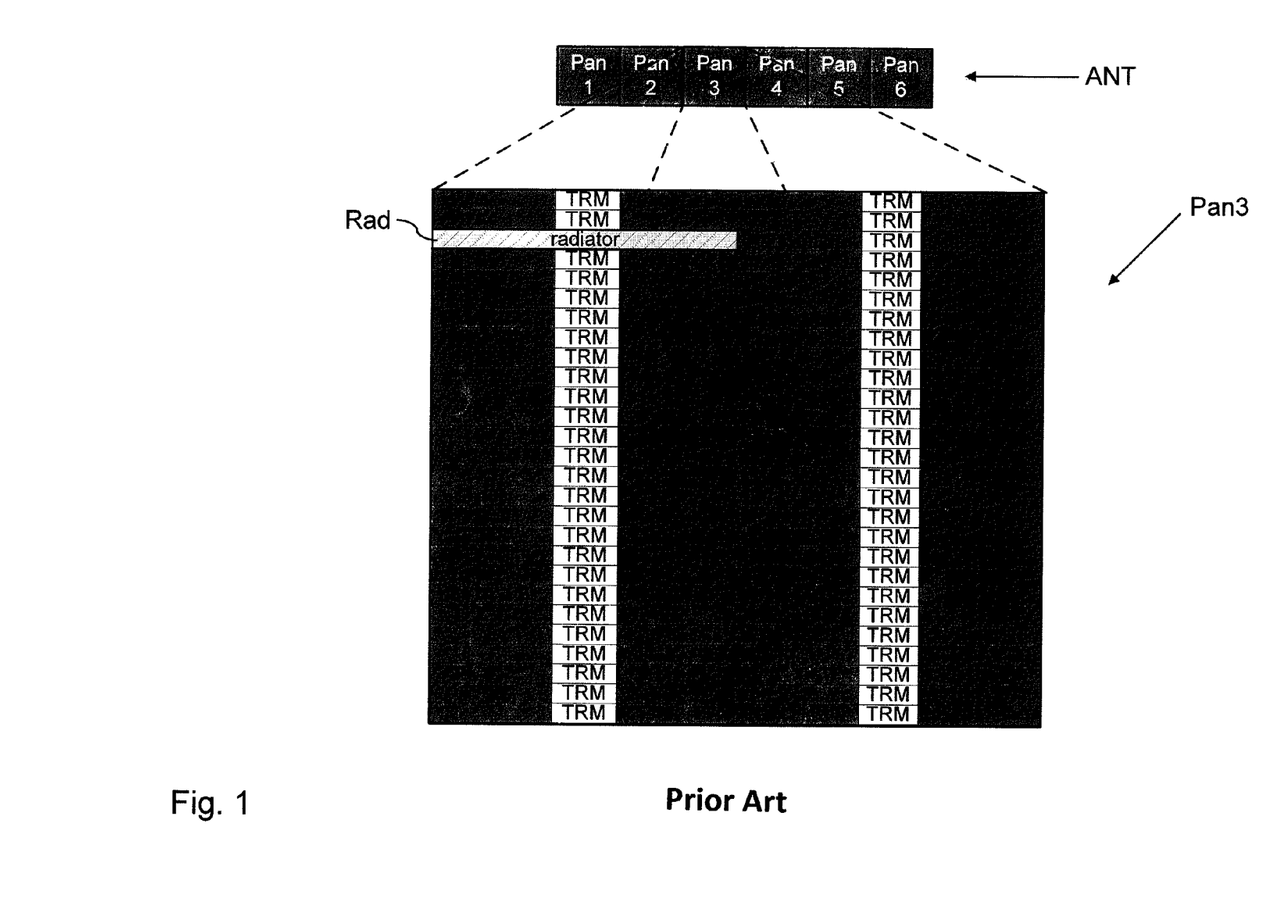
FIG. 1 diagrammatically represents of a known planar phased array antenna with several panels as partial antennas, wherein for a panel a corresponding arrangement of radiators is shown as phase centers.

A SAR system of this type is used, for example, with space-based SAR instruments. FIG. 1 diagrammatically represents a planar phased array antenna ANT. Antenna ANT may include, by way of non-limiting example, six panels, i.e., Pan1-Pan6, as partial antennas with respectively 56 radiators Rad as phase centers and a corresponding number of transmit/receive modules TRM. Electronic components of antenna ANT, and in particular components for digital beam forming (DBF), are not illustrated. Each of panels Pan1-Pan6 in the exemplary embodiment includes two radiators Rad in the horizontal direction (typically in the direction of flight) and 28 horizontal radiator pairs in the vertical direction (elevation). In the embodiment of FIG. 1, the horizontal direction runs from left to right, and the vertical direction runs from top to bottom. Radiators Rad have their feed points for transmit signals or receive signals respectively in the center. The already mentioned transmit/receive module TRM is arranged behind each of the feed points.

Figure 2:
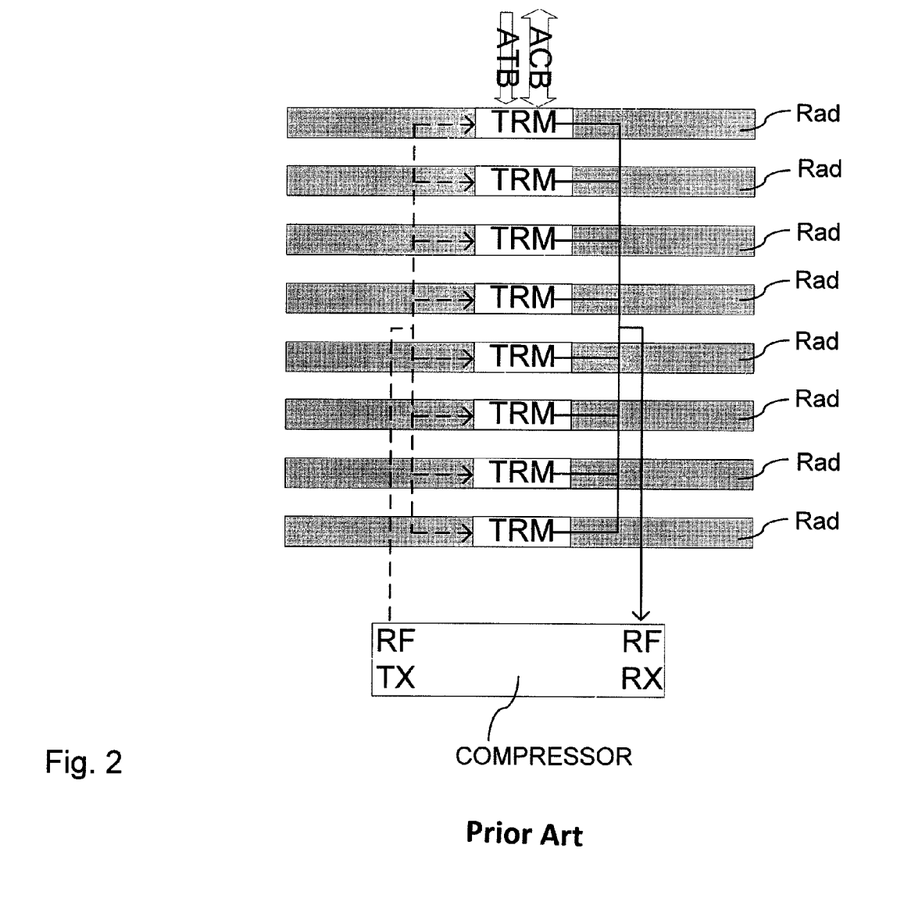
FIG. 2 illustrates a known HF network of a typical SAR antenna without digital beam forming.

Each transmit/receive unit TRM has on an instrument side an input for a high-frequency transmit signal (HF transmit signal) and an output for a high-frequency receive signal (HF receive signal). The HF transmit signal is referred to as a radar transmit pulse, and the HF receive signal is referred to as a radar echo. In the present specification, each transmit/receive module TRM represents an individual channel. In principle, it is understood that several transmit/receive modules can be combined to form a channel. The transmit/receive modules TRM are controlled, for example, via electrical line buses, such as antenna timing bus (ATB) and an antenna control bus (ACB). In phased array antennas for SAR systems, a HF network for transmit signal distribution and at least one further network for the receive signal combination is typically provided on the antenna. FIG. 2 diagrammatically illustrates the HF network of a typical antenna for only eight radiators Rad, but without digital beam formation. For better clarity, the eight radiators Rad are shown with vertical spacing from one another. The transmit/receive modules TRM are coupled to a central electronic system COMP. If a signal is to be transmitted by the radiator Rad of the antenna ANT, this is fed via an output RF TX as a transmit signal to the transmit/receive modules TRM. An analogously combined receive signal of the transmit/receive modules TRM, which is formed from the respective signals of the transmit/receive modules TRM of the radiators Rad, is digitized, further processed and finally recorded in the central electronic system COMP arranged apart from the antenna. The combined receive signal is fed to the central electronic system COMP at an input RF RX.

It is known to use digital beam forming to increase the power of radar antennas. With SAR systems this is used, for example, in high resolution wide swath (HRWS) instruments. One possible embodiment is described in EP 1 241 487 A1, the disclosure of which is expressly incorporated by reference herein in its entirety. In digital beam forming, the receive signals of all channels (in the exemplary embodiment, all transmit/receive modules) are processed before combination. The processing or handling of the receive signals is usually carried out digitally. A non-limiting exemplary HRWS architecture is shown diagrammatically in FIG. 3, however, the radiators are not shown for reasons of clarity and ease of explanation. The analog receive signals originating from the transmit/receive modules TRM are respectively digitized and processed in a digital beam forming module DBFM and conveyed as a data stream data RX to the central electronic system. In this way, the data stream is realized as a chain, since the signal combination after the digitalization is a summation. In each beam forming module DBFM, the individual signal and the signal of the predecessor in the chain are added before being forwarded.

Figure 4:
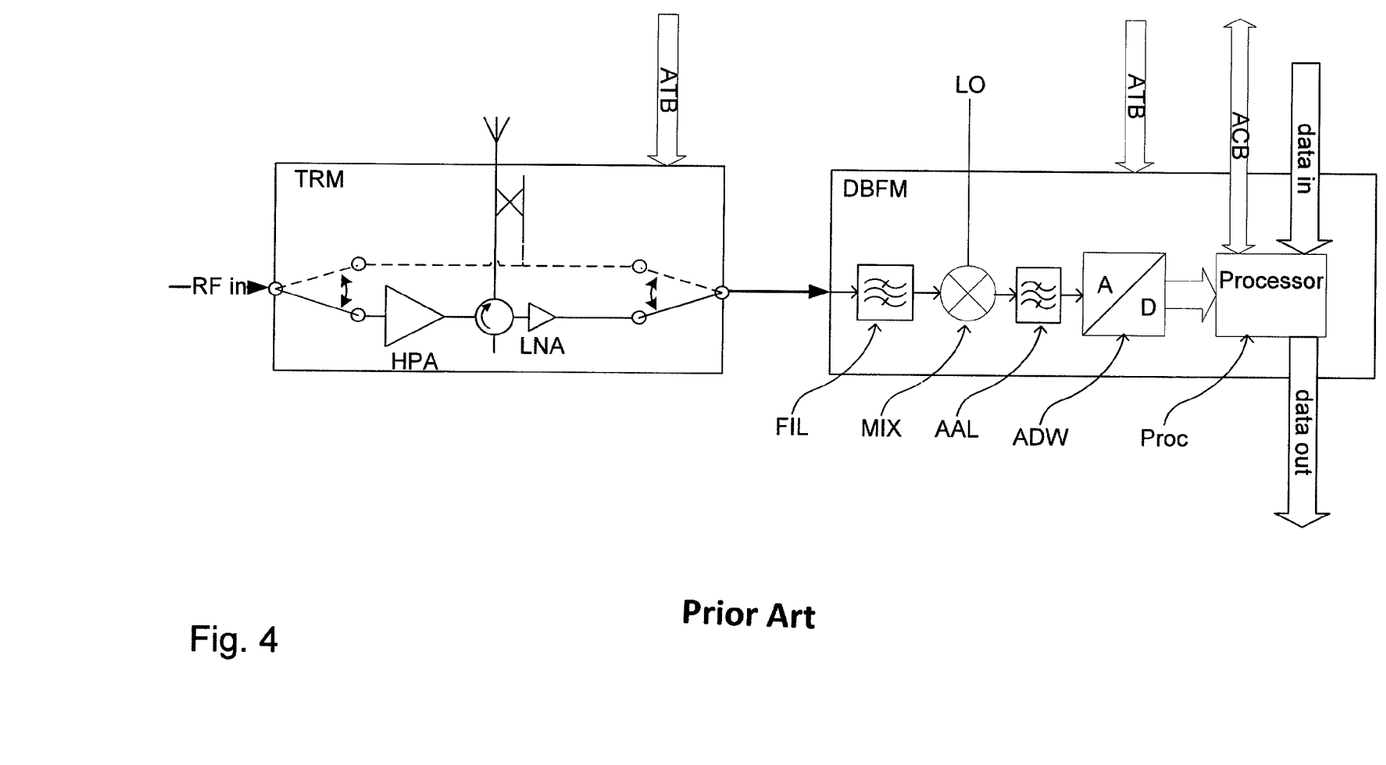
FIG. 4 diagrammatically represents of the architecture of a known signal processor for an individual receive channel.

The functions of the beam forming module DBFM utilize a signal filtering, a down-mixing of the signal to the baseband, an anti-alias filtering, a digitalization, an application of the beam forming algorithms for the current channel on the digital signal, a coherent, i.e., synchronous summation of the local signal with that of the preceding signal and the forwarding of the sum signal to the next channel, i.e., forwarding to the following beam forming module in the chain. The components FIL, MIX, AAL, ADW and Proc for performing the process are illustrated in FIG. 4 albeit without detailed consideration of an amplifier arrangement. The architecture of a single channel is thereby shown without variable damping elements and phase control elements. The signal data out resulting at the end is the signal in the baseband which a receive antenna would generate with the algorithmically adjusted receive beam.

The described procedure described in EP 1 241 487 A1 contains the early digitalization of the signals already on or at the output of the antenna. As a result, the receive-side architecture of the antenna changes fundamentally compared to a classic antenna without beam formation. The analog receive network used there is replaced by so-called high-speed serial links (HSSL), that is, quick serial data lines. This results from the fact that large data volumes at a high data rate have to be transmitted from the antenna to the central electronic system or directly to the mass storage device. Depending on the bandwidth of the radar, data rates per panel of several 10 Gbps ($10 \times 10^9$ bits per second) can occur.

Figure 3:
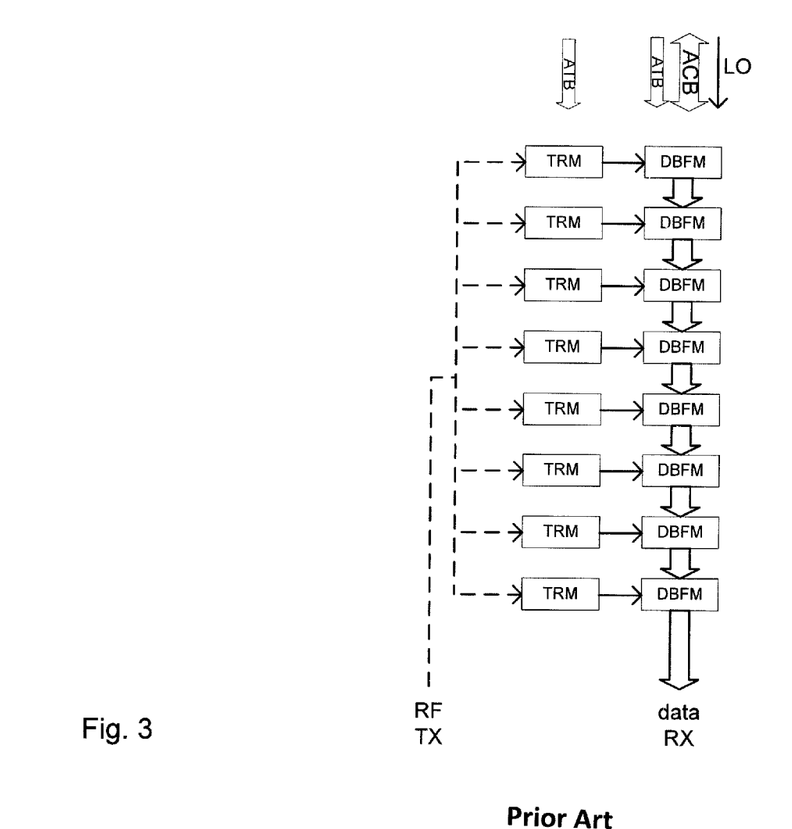
FIG. 3 illustrates a known HRWS architecture of a SAR system.

This leads to a high implementation expenditure in particular with spaceborne-capable components with many parallel lines and considerable data processing expenditure. For HRWS instruments with high resolution, very powerful and expensive processing units, generally field-programmable gate array (FPGAs), are used for the data processing, however, the airworthiness of these units have not been unreservedly acknowledged. Furthermore, the high data rates of the receive chain lead to complex cable runs and high power consumption. A further problem of the architecture according to FIG. 3 is the fault dependency of the components on one another. A single error in the HSSL data chain brings the function of the entire panel to a stop. The architecture in the form shown is therefore not airworthy and requires a redundancy concept, which further increases the complexity in the receive chain.

A SAR system with digital beam forming modules is known from the publication FISCHER, C. et al.: *Development of a High-Resolution Wide Swath SAR Demonstrator in: 8th European Conference on Synthetic Aperture Radar (EU-SAR)*, 2010, p. 1166-1169, the disclosure of which is expressly incorporated by reference herein in its entirety. A beam sum formation for obtaining an output signal within the scope of the digital beam forming method is carried out in the digital range.

SUMMARY OF THE INVENTION

Embodiments of the present invention relate to a SAR system with a radar antenna with which signal processing can be carried out in a simpler manner. The system should meet the requirement of airworthiness.

The invention is directed to a SAR system with an antenna that includes one or more partial antennas. Each partial antenna includes a plurality of phase centers, transmit/receive modules assigned thereto, and a signal processor for the coherent processing of signals of the phase centers. According to embodiments, the signal processor includes a hybrid beam forming module for digitalization and processing of an analog receive signals received by the transmit/receive modules of the phase centers (radiators). The hybrid beam forming module is embodied or formed to convert digitally processed receive signals into analog receive signals and to feed them to an analog receive network so as to combine the analog signals of the respective transmit/receive modules with one another to form an output signal.

The invention further relates to a method for processing SAR signals with an antenna, which includes one or more partial antennas. Each partial antenna includes a plurality of phase centers, transmit/receive modules assigned thereto, and a signal processor for the coherent processing of signals of the phase centers (radiators). In the method, the analog receive signals received by the transmit/receive modules of the radiators are digitized and processed by a hybrid beam forming module of the signal processor. Subsequently, the digitally processed receive signals are converted into analog receive signals and fed to an analog receive network. Finally, the analog signals of the respective transmit/receive modules are combined with one another by the analog receive network to form an output signal.

Embodiments reduce the implementation demands made by the digital processing described at the outset by returning to the classic analog receive network but without abandoning the advantages of flexible digital signal processing. The signal summation is removed from the digital signal processing, since signal summation is realized more efficiently in analog technology according to the invention. As explained at the outset, a digital summation of signals with low signal-to-noise-ratio (SNR) but good word length for the necessarily large dynamic range is not optimal in terms of efficiency aspects. Due to the relatively high noise level with the individual channels, no appreciable additional signal losses are observed due to the digital-to-analog reconversion provided.

The combination of the analog signals of the respective transmit/receive modules to form an output signal is efficiently realized in analog technology. To this end, the hybrid beam forming module is provided, which digitizes the respective receive signals of the transmit/receive modules in the usual way and thereafter processes them digitally. The synchronized and preferably corrected digital signal is subsequently reconverted into an analog signal and fed into the analog receive network for further processing. In this manner, the hybrid beam forming module can be implemented, e.g., on a single chip, in so-called "mixed signal" technology. This can be provided between a respective transmit/receive module and the analog receive network. Ideally, the arrangement is integrated into the transmit/receive module. As a result, the signal sum formation, which according to the invention is realized more efficiently in analog technology, is removed from the digital signal processing.

In particular, the antenna can be embodied or formed as a planar phased array antenna.

According to an advantageous embodiment, the beam forming module is further embodied or formed during the processing of the digitized receive signals to process them for digital beam formation and to synchronize them with one another and optionally to correct them. The early digitization of the individual receive signals is expedient in order to be able to carry out the beam forming functions with the necessary precision. The digitization also permits a highly accurate synchronization of the receive signals before they are combined, which is usually the last step of beam formation. Via the analog combination of the signals, the expenditure can be greatly reduced compared to digital processing. In this manner, the complexity of the entire antenna can be kept low hereby.

It is further expedient if the beam forming module includes a digital-to-analog converter by which the digitally processed receive signals can be converted into the respective analog signals.

In particular, the analog receive network is connected immediately downstream of the digital-to-analog converter.

In a further expedient embodiment, the combination of the analog signals by the analog receive network includes a summation of the signals so that the output signal is a sum signal.

It is furthermore expedient if the signal processor is embodied or formed to calibrate the analog signals. A digital calibration signal necessary for the calibration can be directly generated at the inputs of the analog receive network thereby.

According to a further expedient embodiment, the signal processor for processing the output signal generated by the analog receive network feeds the output signal to an analog-to-digital converter of a central processing unit. A further processing of the digital output signal can be carried out by the central processing unit hereby in the usual manner.

Expediently, the signal conversion is carried out by the digital-to-analog converter and/or by the analog-to-digital converter in the baseband or at low frequency.

It is furthermore expedient if the signal processor is embodied or formed to combine the signals of several transmit/receive modules to form a signal channel before the analog conversion by the digital-to-analog converter. In this case, the receive signals of the channel are digitized in the manner known from the prior art and thereafter digitally processed. The synchronized and optionally corrected, summed digital signal is subsequently reconverted into the analog signal and fed into the analog receive network.

It is furthermore expedient if the signal processor in a feedback channel includes an upward mixer, an amplifier and a filter to generate a digital chirp signal, which is fed on a carrier frequency and as a transmit signal to the transmit/receive module. One advantage of this embodiment lies in that the high-frequency network for the transmit signal can be omitted.

The procedure according to the invention has the following advantages:

- Compared to the solutions known from the prior art, reduced processor complexity results. This can be due to the omission of two HSSL interfaces and the associated logic synchronization and Error Detection and Correction (EDAC) expenditure. A data buffer for the synchronization of the latency period of an entire chain with, e.g., 28 channels can be omitted compared to the fully digital solution. The reduction of power consumption achieved with the reduction of the processor complexity lies in a similar order of magnitude as that of the additional digital-to-analog converter required according to the invention.
- The architecture of the suggested SAR system is inherently redundant within the meaning of a "graceful degradation."
- In the case of systems with high dynamic range, the resolution of the analog-to-digital converter for the processing and synchronization of a respective analog receive signal of a channel is to be set high, e.g., 10 or 12 bit. The word length resulting from this with a fully digital processing leads to high data rates on the HSSL data chain. However, as this limitation does not exist in the proposed system, one needs only to only to select a correspondingly large word length of the digital-to-analog converter.
- The requirement of a digital fractional decimation filter for lossless data compression, which is necessary in part with fully digital processing, does not apply. This filter is the most complex digital filter to be found in the conventional beam forming module.
- The processor and the digital-to-analog converter can be used for calibrating signal generation in the calibration of the receive network.
- All of the digital control functions of the transmit/receive module and a so called tile control unit (TCU) for controlling the antenna panel can be transmitted in the central processor. This unit is simplified accordingly.

If the system has the described feedback channel, the following advantages result in addition:

- A high radiometric precision can be achieved with the associated antenna. In this way, the signal processor can be calibrated particularly well.
- A part of the central electronic system for generating the transmit signal and the transmit-side high-frequency network can be omitted. The locally generated transmit signal does not run through a long transmit network that has to be calibrated. Lower signal to noise ratio demands are made on the locally generated transmit signal than on a centrally generated signal.
- Variable damping elements and phase control elements can be omitted if a respective signal processor assigned to a transmit/receive module is equipped with the feedback channel. The variable damping elements and phase control elements are necessary, however, if several transmit/receive modules are jointly assigned to a signal processor, as is the case, for example, with the combination to form one channel.

Embodiments of the instant invention are directed to a synthetic aperture radar (SAR) system that includes a radar antenna having at least one partial antenna, of which each at least one partial antenna includes a plurality of phase centers with assigned transmit/receive modules and a signal processor for coherent processing of signals of the phase centers. The signal processors include a hybrid beam forming module structured and arranged to digitize and process analog receive signals received by the transmit/receive modules of the phase centers, and to convert the digitally processed receive signals into analog signals. Further, an analog receive network is structured and arranged to combine the analog signals of respective transmit/receive modules with one another to form an output signal.

According embodiments, the hybrid beam forming module may be further structured and arranged to feed the processed analog receive signals to the analog receive network.

In accordance with other embodiments of the invention, the hybrid beam forming module can be further structured and arranged to process the digitized receive signals for digital beam formation and to synchronize digitized receive signals with one another. The hybrid beam forming module can be further structured and arranged to correct the digitized receive signals.

Moreover, the hybrid beam forming module can include a digital-to-analog converter to convert the digitally processed receive signals into respective analog signals. The analog receive network may be connected immediately downstream of the digital-to-analog converter.

According to still other embodiments, the combining of the analog signals by the analog receive network can include a summation of the analog signals, whereby the formed output signal is a sum signal.

In accordance with further embodiments of the present invention, the signal processors can be structured and arranged to calibrate the analog signals with a digital calibration signal directly generated at inputs of the analog receive network.

In further embodiments, a central processing unit can have an analog-to-digital converter, and an output signal processor can be structured and arranged to process the output signal generated by the analog receive network and to feed the processed output signal to the analog-to-digital converter of the central processing unit. The signal conversion by at least one of the digital-to-analog converter and the analog-to-digital converter may be carried out near to or in the baseband.

According to other embodiments of the invention, the signal processors can be structured and arranged to combine the signals of several transmit/receive modules to form a signal channel before the analog conversion by the digital-to-analog converter.

In accordance with still other embodiments, the signal processors can further include a feedback channel having an upward mixer, an amplifier and a filter to generate a digital chirp signal, which is fed on a carrier frequency and as an input signal to the transmit/receive modules.

According to further embodiments, the plurality of phase centers may be included in a plurality of radiators.

Embodiments of the invention are directed to a method for processing SAR signals with a radar antenna having at least one partial antenna, wherein each partial antenna includes a plurality of phase centers, transmit/receive modules assigned to the plurality of phase centers, and a signal processor for coherent processing of signals of the phase centers. The method includes digitizing and processing analog receive signals from the transmit/receive modules of the phase centers, converting the digitally processed receive signals into analog signals and fed to an analog receive network, and combining the analog signals of respective transmit/receive modules with one another to form an output signal.

In accordance with embodiments of the invention, the signal processor may include a hybrid beam forming module to perform the digitizing and processing.

According to other embodiments of the invention, the analog signals can be fed to an analog receive network. The analog signals may be combined by the analog receive network. Further, the method can include calibrating the analog signals with a digital calibration signal directly generated at inputs of the analog receive network.

Moreover, the combining of the analog signals can include a summation of the analog signals.

In accordance with still yet other embodiments of the present invention, the method can further include processing the output signal and feeding the processed output signal to a central processing unit having an analog-to-digital converter.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

The architecture according to embodiments of a SAR system with a radar antenna can be based on the exemplary arrangement described above with respect to FIGS. 1 through 4. As already explained, antenna ANT can be composed of a number of partial antennas Pan1-Pan6, and each of the partial antennas can include a plurality of phase centers (or radiators) Rad, transmit/receive modules TRM assigned thereto and a signal processor for coherent processing of signals of the phase centers (radiators).

Figure 5:
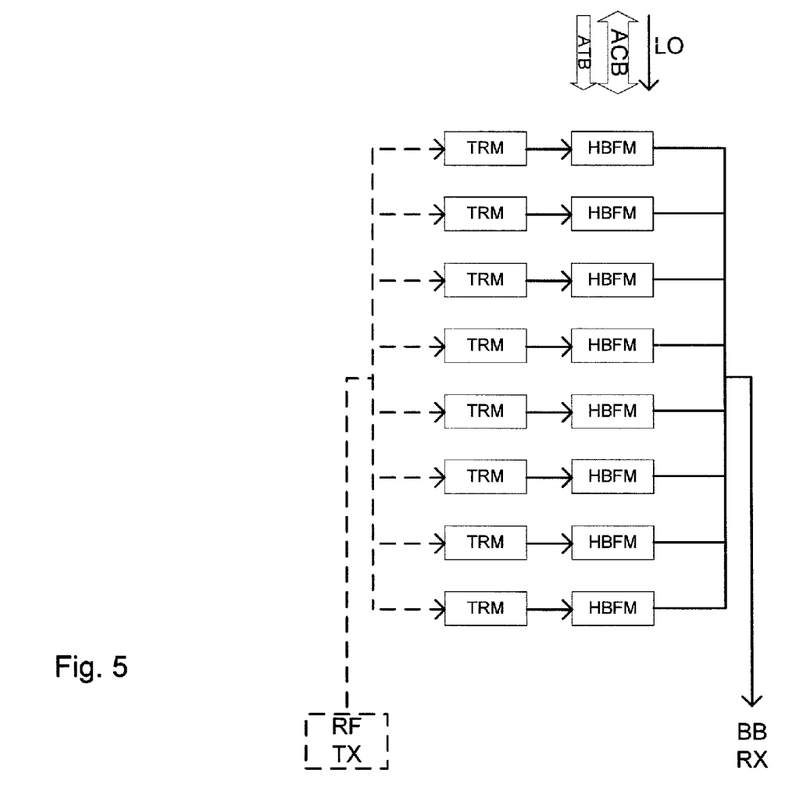
FIG. 5 diagrammatically represents of an architecture according to the invention of a signal processor of a SAR system.

FIG. 5 shows a possible architecture for signal processing according to an embodiment of the invention. In contrast to the description and the representation in FIG. 3, only eight radiators are shown by way of non-limiting example in FIG. 5, as are the components involved in the signal processing. For each radiator (which in the present specification means the same as a channel) a transmit/receive module TRM and a signal processor according to the invention is shown. In contrast to the digital beam forming modules DBFM used in the prior art, a respective signal processor comprises a hybrid beam forming module HBFM.

Figure 6:
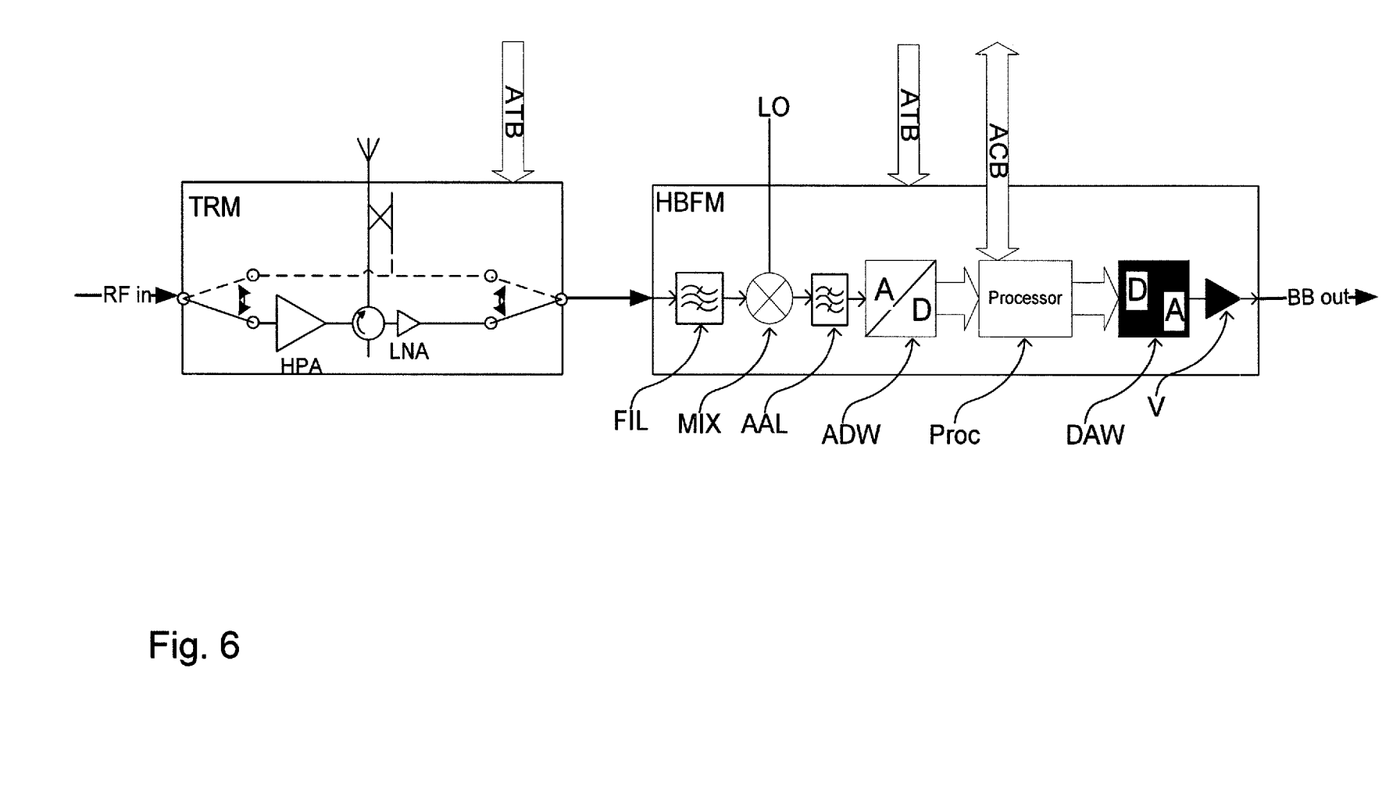
FIG. 6 diagrammatically represents of a signal processing chain, provided according to the invention, of a receive channel.

More precise structure of the transmit/receive module TRM and the hybrid beam forming module HBFM of the signal processor according to embodiments of the invention is shown in FIG. 6. The hybrid beam forming module HBFM—like the digital signal forming unit according to the prior art—comprises a filter FIL for signal filtering, a mixer MIX for down-mixing the analog receive signal into the baseband, an anti-alias filter AAL, an analog-to-digital converter ADW and a processor Proc for applying beam forming algorithms for the current channel on the digital signal. In addition to the foregoing, the hybrid beam forming module HBFM also includes a digital-to-analog converter DAW arranged downstream of the processor Proc and an amplifier V. Signal BBout resulting from hybrid beam forming module HBFM is fed to an analog receive network (not shown in FIG. 6). In the embodiment according to the invention of the beam forming module, a reading in of the output signal of the adjacent channel via an high speed serial link (HSSL) can be omitted.

A digitization of the individual receive channels may take place in the hybrid beam forming module HBFM in order to be able to carry out the functions of beam forming with desired precision. The digitization in the hybrid beam forming module HBFM permits a highly accurate synchronization of all of the channel signals before the combination thereof in the analog receive network.

Hybrid beam forming module HBFM can be implemented on, e.g., a single chip, in so-called "mixed signal" technology, and such a chip may be inserted between a respective transmit/receive module TRM and the analog receive network (not shown in FIGS. 5 and 6). Particularly and preferably, the chip or the hybrid beam forming module HBFM may be integrated into the transmit/receive module.

The embodiments may thus maintain the synchronization and channel adjustment taking place in the digital range of the beam forming module. Thus, only the simple summation of the data emitted per channel is carried out in an analog manner by a high frequency signal combination.

The analog output signal of each channel may be located in or near to the baseband and can therefore be more easily controlled radiometrically than at carrier frequency. With classic SAR systems, the receive signals are combined and successfully calibrated at carrier frequency. A calibration of the receive signal network also takes place in the SAR system according to the invention so that the calibration signal is digitally generated at the network inputs.

A deterioration of the radar receive signal does not need to be accepted because of the insertion of the additional digital-to-analog converter DAW and of a further analog-to-digital converter, which can be additionally included, e.g., in the central electronic system (shown in FIG. 2) and utilized with the embodiments of the invention. An arbitrarily good quality of the analog signal can be achieved by suitable selection of the scanning rate and resolution of the digital-to-analog converter DAW. The quantization noise fed to the signal should be negligible compared to the existing inherent signal noise. The channel signal present before the digital-to-analog conversion basically has a high noise level (typically SNR<16 db at highest dynamic range) so that digital-to-analog converters can already be used in the average power spectrum.

The analog-to-digital conversion of the sum signal takes place in the central electronic system COMP, not shown in FIGS. 4 through 9, apart from the antenna. It is sufficient if the analog-to-digital conversion of the sum signal takes place only once per panel. Analog-to-digital converters with high resolution (e.g., 12 bit) can be used here. The digital-to-analog and analog-to-digital conversion additionally inserted with respect to the conventional beam forming module is furthermore carried out with the hybrid beam forming module on a signal in or near to the baseband. In this manner, the demands on components and scanning are substantially reduced compared to a signal in the carrier frequency band.

Figure 9:
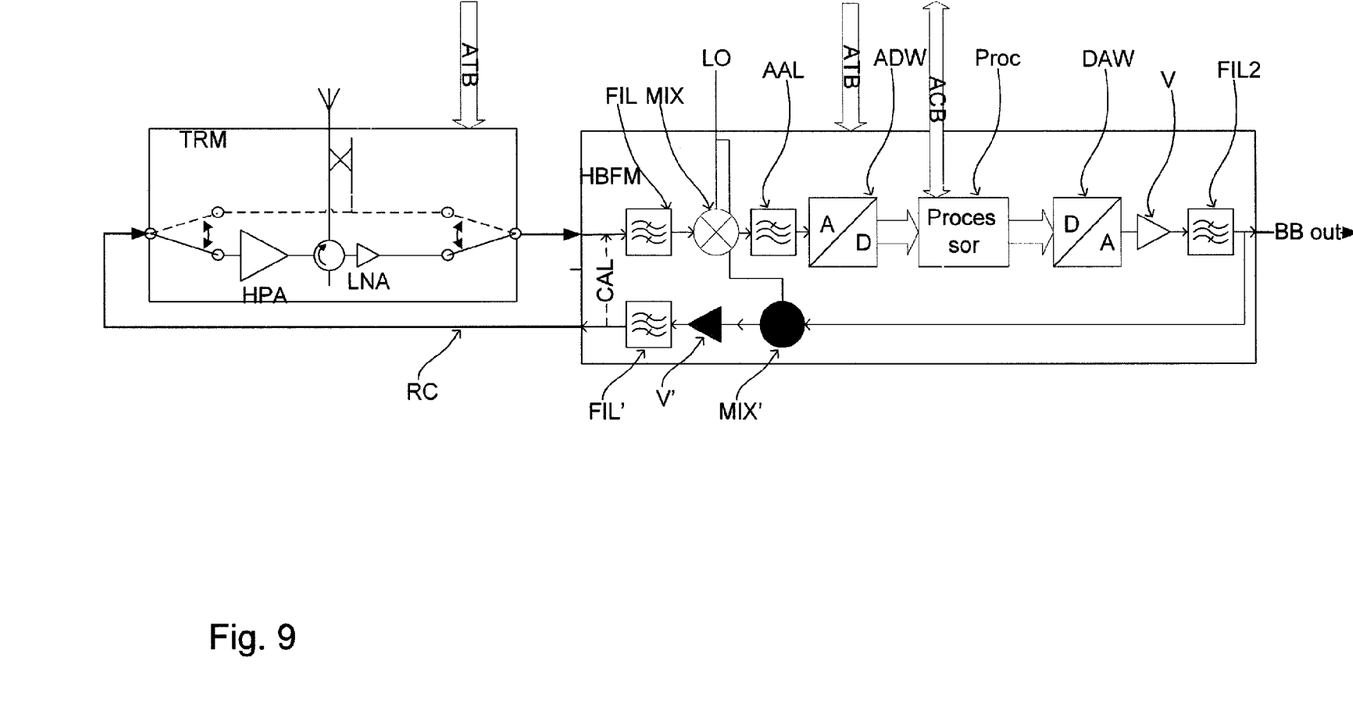
FIG. 9 diagrammatically represents of a signal processing chain according to the invention in modified form.

In an unillustrated embodiment variant, several receive signals received by the transmit/receive modules TRM can be connected to form one signal channel. This is in particular expedient when no high demands are made on the antenna agility. In this manner, the antenna electronic system can be further reduced in terms of its complexity. The availability of the digital-to-analog converter DAW in the beam forming module opens up further possibilities if—as shown in FIG. 9—an additional line (feedback channel RC) is provided with an upward mixer MIX', amplifier V' and filter FIL'. In this embodiment, feedback channel RC can be coupled to the input of the transmit/receive module TRM. In a further aspect of this embodiment, processor PROC can generate a digital chirp signal, which is modulated on the carrier frequency and is conveyed as an input signal to transmit/receive module TRM, during the transmit pulse duration. In this case, the HF network for the transmit signal can be omitted, as diagrammatically illustrated in FIG. 8.

Figure 7:
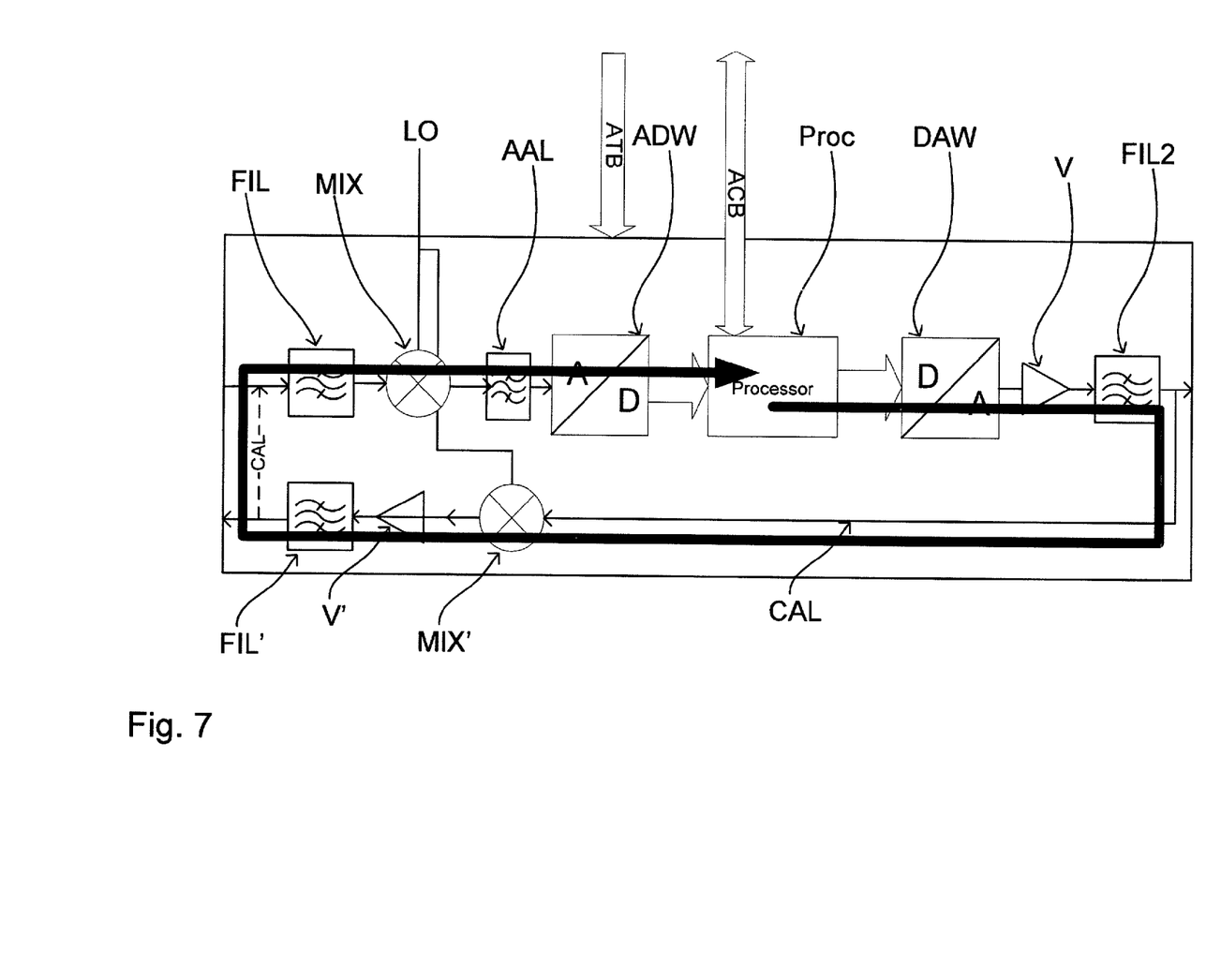
FIG. 7 illustrates a calibration path in a signal processor according to the invention.
Figure 8:
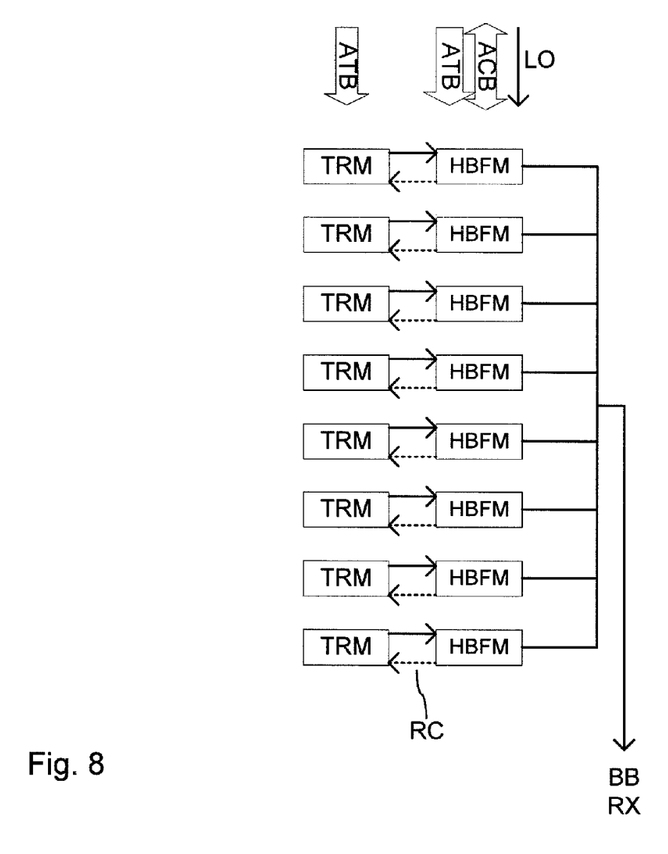
FIG. 8 diagrammatically represents of the network infrastructure of a modified exemplary embodiment of the architecture of a signal processor according to the invention.

The advantages of this solution are a high radiometric accuracy, which can be achieved with the associated antenna. The hybrid beam forming module HBFM shown in FIG. 9 can be calibrated particularly well if a closed calibration path CAL shown in FIG. 7 is adjusted. A further advantage is the omission of a part of the central electronic system for generating the transmit signal and the transmit-side HF network. The locally generated transmit signal does not run through a long transmit network that has to be calibrated. Furthermore, lower SRN demands are made on the locally generated transmit signal than on a centrally generated transmit signal.

If a hybrid beam forming module HBFM embodied or formed as in FIG. 9 is provided for each transmit/receive module TRM, all variable damping elements and phase control elements can be omitted.

The hybrid beam forming module provided according to the invention restricts the use of the digital technology that is resource-intensive at high data rates to the complex algorithmic functions and leaves the simple summation of synchronous signals to the more efficient analog range. This leads to a reduction in the complexity and quantity of electronic systems for the beam forming module on the antenna and thus to cost advantages. In particular, a processor with reduced computing power compared to the prior art can be used. Furthermore, HSSL chain members may be omitted.

The proposed architecture is inherently error redundant within the meaning of a "graceful degradation," as with transmit/receive modules TRM. Therefore no redundancies are necessary with the signal processing modules and data groups, which likewise is beneficial in terms of the quantity of electronic systems to be installed and consequently to production costs.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A synthetic aperture radar (SAR) system comprising:
   a radar antenna having at least one partial antenna, of which each at least one partial antenna comprises a plurality of phase centers with assigned transmit/receive modules and a signal processor for coherent processing of signals of the phase centers;
   each of the signal processors comprising a hybrid beam forming module configured to digitize and process analog receive signals received by the transmit/receive modules of the phase centers, and to convert the digitally processed receive signals into analog signals, and
   an analog receive network configured to combine the analog signals of respective transmit/receive modules with one another to form an output signal.

2. The SAR system according to claim 1, wherein the hybrid beam forming module is further configured to feed the processed analog receive signals to the analog receive network.

3. The SAR system according to claim 1, wherein the hybrid beam forming module is further configured to process the digitized receive signals for digital beam formation and to synchronize digitized receive signals with one another.

4. The SAR system according to claim 3, wherein the hybrid beam forming module is further configured to correct the digitized receive signals.

5. The SAR system according to claim 1, wherein the hybrid beam forming module comprises a digital-to-analog converter to convert the digitally processed receive signals into respective analog signals.

6. The SAR system according to claim 5, wherein the analog receive network is connected immediately downstream of the digital-to-analog converter.

7. The SAR system according to claim 1, wherein the combining of the analog signals by the analog receive network comprises a summation of the analog signals, whereby the formed output signal is a sum signal.

8. The SAR system according to claim 1, wherein the signal processors are configured to calibrate the analog signals with a digital calibration signal directly generated at inputs of the analog receive network.

9. The SAR system according to claim 1, further comprising:
   a central processing unit having an analog-to-digital converter; and
   an output signal processor configured to process the output signal generated by the analog receive network and to feed the processed output signal to the analog-to-digital converter of the central processing unit.

10. The SAR system according to claim 9, wherein the signal conversion by at least one of the digital-to-analog converter and the analog-to-digital converter is carried out near to or in the baseband.

11. The SAR system according to claim 1, wherein the signal processors are configured to combine the signals of several transmit/receive modules to form a signal channel before the analog conversion by the digital-to-analog converter.

12. The SAR system according to claim 1, wherein the signal processors further comprise a feedback channel having an upward mixer, an amplifier and a filter to generate a digital chirp signal, which is fed on a carrier frequency and as an input signal to the transmit/receive modules.

13. The SAR system according to claim 1, wherein the plurality of phase centers is included in a plurality of radiators.

14. A method for processing SAR signals with a radar antenna having at least one partial antenna, wherein each partial antenna includes a plurality of phase centers, transmit/receive modules assigned to the plurality of phase centers, and a signal processor for coherent processing of signals of the phase centers, the method comprising:
   digitizing and processing analog receive signals from the transmit/receive modules of the phase centers;
   converting the digitally processed receive signals into analog signals and to be fed to an analog receive network; and
   combining the analog signals of respective transmit/receive modules with one another to form an output signal.

15. The method according to claim 14, wherein the signal processor comprises a hybrid beam forming module to perform the digitizing and processing.

16. The method according to claim 14, feeding the analog signals to the analog receive network.

17. The method according to claim 16, wherein the analog signals are combined by the analog receive network.

18. The method according to claim 16, further comprising calibrating the analog signals with a digital calibration signal directly generated at inputs of the analog receive network.

19. The method according to claim 14, wherein the combining of the analog signals comprises a summation of the analog signals.

20. The method according to claim 14, further comprising:
   processing the output signal; and
   feeding the processed output signal to a central processing unit having an analog-to-digital converter.

* * * * *